US012767564B2

(12) United States Patent
Klink

(10) Patent No.: US 12,767,564 B2
(45) Date of Patent: Oct. 20, 2026

(54) METHOD AND REACTOR DEVICE FOR DISINFECTING WATER BY MEANS OF UV LIGHTING

(71) Applicant: HYTECON AG, Lucerne (CH)

(72) Inventor: Maximilian Klink, Lucerne (CH)

(73) Assignee: HYTECON AG, Lucerne (CH)

( * ) Notice: Subject to any disclaimer, the term of this patent is extended or adjusted under 35 U.S.C. 154(b) by 372 days.

(21) Appl. No.: 18/536,595

(22) Filed: Dec. 12, 2023

(65) Prior Publication Data

US 2024/0190725 A1 Jun. 13, 2024

(30) Foreign Application Priority Data

Dec. 12, 2022 (DE) ......................... 102022133017.6

(51) Int. Cl.
*C02F 1/32* (2023.01)

(52) U.S. Cl.
CPC ...... *C02F 1/325* (2013.01); *C02F 2201/3222* (2013.01); *C02F 2201/326* (2013.01); *C02F 2303/04* (2013.01)

(58) Field of Classification Search
CPC .............. C02F 1/325; C02F 2201/3222; C02F 2201/326; C02F 2303/04; C02F 2201/3227; C02F 2209/40; C02F 1/008
(Continued)

(56) References Cited

U.S. PATENT DOCUMENTS

| | | | |
|---|---|---|---|
| 11,045,573 | B2 | 6/2021 | Tirén |
| 2010/0044319 | A1 | 2/2010 | Engel et al. |

(Continued)

FOREIGN PATENT DOCUMENTS

| | | | |
|---|---|---|---|
| CN | 109 052 553 | A | 12/2018 |
| DE | 19824423 | A1 | 12/1999 |

(Continued)

OTHER PUBLICATIONS

European Office Action dated Aug. 8, 2025, issued in related European Application No. EP 23 214 703.3.

*Primary Examiner* — Hayden Brewster

(57) ABSTRACT

Methods for disinfecting water such as drinking water, waste water, service water, or process water, by means of UV lighting in a reactor device, in which water which is to be disinfected is introduced via an inlet in a reactor chamber of the reactor device, the water which is to be disinfected in the reactor chamber is illuminated with UV light by means of a UV lighting system, and disinfected water is discharged from the reactor chamber via an outlet, wherein furthermore the following is provided: provision of the UV light by means of an arrangement of UV light emitting diodes of the UV lighting system of the reactor device; operating the UV light emitting diodes by means of a driver system of the reactor device associated with the arrangement of UV light emitting diodes; controlling an operation of the driver system by means of a control system of the reactor device; monitoring of at least one electrical operating parameter for the arrangement of UV light emitting diodes during the disinfecting of the water by means of the UV light with the aid of a monitoring system of the reactor device, which is connected to the control system; comparing a current measurement value for the at least one electrical operating parameter, which is detected by means of the monitoring system, with a comparative value for the at least one electrical operating parameter; generating of control signals as a function of the result of the comparison of current measurement value and comparative value for the at least one electrical operating parameter by means of the control system; and controlling the operation of the reactor device in accordance with the control signals. Furthermore, a reactor device is provided.

11 Claims, 2 Drawing Sheets

(58) Field of Classification Search
USPC ...................................................... 210/748.01
See application file for complete search history.

(56) References Cited

U.S. PATENT DOCUMENTS

| | | | | |
|---|---|---|---|---|
| 2014/0091044 | A1 | 4/2014 | Jhawar et al. | |
| 2019/0298879 | A1 * | 10/2019 | Tirén | A61L 9/20 |
| 2021/0292193 | A1 | 9/2021 | Emery et al. | |
| 2022/0119280 | A1 | 4/2022 | Bascin | |

FOREIGN PATENT DOCUMENTS

| | | | |
|---|---|---|---|
| DE | 202020100960 | U1 | 2/2020 |
| DE | 102020108265 | A1 | 9/2021 |
| EP | 2 931 664 | B1 | 6/2017 |

* cited by examiner

METHOD AND REACTOR DEVICE FOR DISINFECTING WATER BY MEANS OF UV LIGHTING

CROSS-REFERENCE TO RELATED APPLICATION

This application claims the benefit and priority of German Application No. 102022133017.6 filed Dec. 12, 2022. The entire disclosure of the above application is incorporated herein by reference.

The invention relates to a method and a reactor device for disinfecting of water, such as drinking water, waste water, service water, or process water by means of UV lighting.

BACKGROUND

UV light can be used in order to disinfect water. Usually here the water which is to be disinfected is introduced via an inlet in a reactor chamber and, during its stay in the reactor chamber, is illuminated with UV light which is provided by a UV lighting system. The disinfected water leaves the reactor chamber via an outlet and is delivered to its respective use. For the generating of the UV light, the UV lighting systems are formed with gas discharge lamps and/or UV light emitting diodes (UV-LED).

In particular in connection with industrial-scale plant for water treatment, for example in plant for public drinking water supply or the provision of process water for industrial applications, it is of particular importance that the disinfection of the water, carried out by means of UV light, is carried out in accordance with the required specifications.

Document DE 20 2020 100 960 U1 relates to a device for the disinfection of a fluid, preferably of water, having: a fluid path through which the fluid which is to be disinfected is conveyed, and a radiation source for the generation of radiation, which acts in a disinfecting manner, wherein the radiation source is arranged relative to the fluid path in such a way that the fluid is acted upon by the radiation during the conveying, characterized in that the radiation source comprises at least one UV-LED.

In the document DE 198 24 423 A1 a circuit arrangement is disclosed for operating a UV lamp in a disinfection reactor. The document DE 10 2020 108 265 A1 discloses a device for the disinfecting of a fluid with UV LEDs.

SUMMARY

It is an object of the invention to indicate a method and a reactor device for disinfecting water such as drinking water, waste water, service water or process water by means of UV lighting, by which an improved monitoring of the correct implementation of the disinfection process is enabled.

As a solution, a method and a reactor device are created for disinfecting water such as drinking water, waste water, service water or process water by means of UV lighting according to the independent claims 1 and 11. Embodiments are the subject of dependent subclaims.

According to one aspect, a method is created for disinfecting water such as drinking water, waste water, service water or process water by means of UV lighting in a reactor device, in which water which is to be disinfected is introduced via an inlet in a reactor chamber of the reactor device, the water which is to be disinfected is illuminated with UV light in the reactor chamber by means of a UV lighting system, and disinfected water is discharged from the reactor chamber via an outlet. The following is furthermore provided in the method: Provision of the UV light by means of an arrangement of UV light emitting diodes of the UV lighting system of the reactor device; operating of the UV light emitting diodes by means of a driver system of the reactor device associated with the arrangement of UV light emitting diodes; controlling of an operation of the driver system by means of a control system of the reactor device; monitoring of at least one electrical operating parameter for the arrangement of UV light emitting diodes during the disinfecting of the water by means of the UV light with the aid of a monitoring system of the reactor device, which is connected to the control system; comparing a current measurement value for the at least one electrical operating parameter, which is detected by means of the monitoring system, with a comparative value for the at least one electrical operating parameter; generating of control signals as a function of the result of the comparison of current measurement value and comparative value for the at least one electrical operating parameter by means of the control system; and controlling of the operation of the reactor device in accordance with the control signals.

According to a further aspect, a reactor device is created for disinfecting water such as drinking water, waste water, service water or process water by means of UV lighting, which comprises the following: a reactor chamber for receiving water which is to be disinfected; a UV lighting system with an arrangement of UV light emitting diodes for the UV lighting of the water which is to be disinfected in the reactor chamber; a driver system, which is associated with the arrangement of UV light emitting diodes; a monitoring system and a control system, which is connected to the monitoring system and the driver system. The reactor device is configured for the following: delivering of the water which is to be disinfected via in inlet in the reactor chamber, illuminating or irradiating the water which is to be disinfected with UV light in the reactor chamber by means of the UV lighting system, and discharging of disinfected water from the reactor chamber via an outlet; provision of the UV light by means of the arrangement of UV light emitting diodes; operating of the UV light emitting diodes by means of the associated driver system; controlling of an operation of the driver system by means of the control system; monitoring of at least one electrical operating parameter for the arrangement of UV light emitting diodes during the disinfecting of the water by means of the UV light with the aid of the monitoring system; comparing a current measurement value for the at least one electrical operating parameter, which is detected by means of the monitoring system, with a comparative value for the at least one electrical operating parameter; generating of control signals as a function of the result of the comparison of current measurement value and comparative value for the at least one electrical operating parameter; and controlling of the operation of the reactor device in accordance with the control signals.

In the method for disinfecting water, the UV light is generated with the aid of an arrangement of UV light emitting diodes (UV-LED) of the UV lighting system. Provision is made to monitor the correct operation of the UV light emitting diodes with the aid of the monitoring system in such a way that at least one electrical operating parameter for the arrangement of UV light emitting diodes is detected and a current measurement value, detected thereby, for the operating parameter is compared with a comparative value, so that a coinciding or a deviation of the current measurement value from the comparative value can be determined. As a function of the comparison of current measurement value and comparative value, control signals are generated by means of the control system, in order to control the operation of the reactor device based on the control signals. For example, provision can be made to control with the control signals in the reactor device the operation of the arrangement of UV light emitting diodes, in particular by means of actuating of the driver system with the aid of the generated control signals.

In this way, it is made possible for example to monitor and to control the correct mode of operation of the UV lighting system independently of the actual provision of the UV light in the reactor chamber. In contrast to a known testing of the transmission of the UV light in the water in the reactor chamber, the monitoring of the at least one electrical operating parameter enables the detection of a direct parameter for the operation of the arrangement of the UV light emitting diodes. The control system can thus intervene immediately and directly on deviations of target values (comparative value) in a controlling manner. Thus, in an example embodiment, it can be established by means of the comparison of current measurement value and comparative value, whether all UV light emitting diodes which are switched on for operation are still working, or whether these have partially failed. Hereupon, the control system can, for example, generate control signals which indicate the deviations, in particular for signalling to a user.

Ultraviolet light (UV light) is electromagnetic radiation in the wavelength range of approximately 100 nm to approximately 380 nm. Owing to the association with optical radiation, generally the term "UV light" is used. The UV range can be divided into three classes: UV-A, UV-B and UV-C. The range of approximately 200 nm and approximately 280 nm is designated as UVC. In connection with the method and the reactor device for disinfecting water, provision can be made that the UV light emitting diodes of the UV lighting system are configured to provide a UVC illumination or irradiation.

The reactor arrangement can be embodied as a closed system with a closed reactor chamber or as an open system with an open reactor chamber, for example a channel. In the respective reactor chamber, the water which is to be disinfected is received and irradiated or illuminated.

Provision can be made to use a UV lighting system in which the arrangement of UV light emitting diodes is formed on a rod-shaped UV lamp, wherein a lamp portion with the arrangement of UV light emitting diodes is arranged at least partially immersing into the water which is to be disinfected in the reactor chamber. The partial or complete immersion of the lamp portion of the rod-shaped UV lamp into the water which is to be disinfected assists an efficient use of the generated UV light for disinfecting the water. Provision can be made to arrange a plurality of rod-shaped UV lamps in the reactor chamber.

In the implementation of the reactor device as an open system, the UV lighting system can be embodied in such a way that the rod-shaped UV lamp(s) immerse in an opening of the open reactor chamber into the water which is to be disinfected, for example from above into an open channel. In the case of a plurality of UV lamps, these can immerse with different depth into the reactor chamber and thus into the water which is to be disinfected. A filling level can be determined here for the water in the reactor chamber by means of a filling level measuring system, in order to operate the UV lamps as a function of the filling level, for example to switch on the UV lamp(s) which currently immerse at least partially into the water. A reaction to rising and/or falling water levels can thus take place.

Alternatively or additionally, provision can be made to operate the UV light emitting diodes along the length of the rod-shaped UV lamps partially as a function of the measured filling level, for example to only switch on the UV light emitting diodes which together switch on the portion, which are arranged in the region of a portion of the UV lamp which currently immerses into the water.

With the at least one rod-shaped UV lamp, provision can be made that the UV light emitting diodes in the region of the lamp portion are connected to an associated cooling body, which is configured to dissipate heat which occurs in operation of the UV light emitting diodes. The cooling body can be formed partially by means of or on a board associated with the UV light emitting diodes.

The arrangement of UV light emitting diodes can be formed with the UV lamp in an encasing tube extending in the lamp portion, which encasing tube has windows permeable to UV light for the radiating of the UV light. The encasing tube can be made substantially entirely from a material which enables the radiation of the UV light, for example from quartz glass.

Provision is made to use a UV lighting system in which the arrangement of UV light emitting diodes comprises a plurality of partial arrangements of UV light emitting diodes which form a respective UV lamp and which in operation of the UV lighting system are operated separately from one another by means of the driver system and are controlled separately from one another by means of the control system. Provision is made to detect the at least one electrical operating parameter respectively separately for the plurality of UV lamps, so that an individual monitoring of the respective partial arrangement of UV light emitting diodes is enabled. Accordingly, the control system generates individual control signals for the respective partial arrangement of UV light emitting diodes separately.

On monitoring of the at least one electrical operating parameter, a current—and/or a voltage measurement value can be detected for the arrangement of UV light emitting diodes, which is compared with a current—/voltage comparative value. The current- and/or voltage measurement vales can indicate for example the failure of a portion of the arrangement of UV light emitting diodes.

For monitoring the at least one electrical operating parameter and for comparing the current measurement value, a circuit arrangement with a comparator circuit and a logic circuit can be used. In the case of a plurality of partial arrangements of UV light emitting diodes, a partial circuit arrangement with comparator circuit and logic circuit can be assigned respectively to these. The circuit arrangement or parts hereof can be integrated into one or more of the following systems: monitoring system, driver system and control system.

During the operation of the UV lighting system, detection can be carried out continuously on monitoring of the at least one electrical operating parameter for the arrangement of UV light emitting diodes. A continuous, therefore chronologically not interrupted monitoring of the at least one electrical operating parameter during the operation of the UV lighting system can be provided in one example embodiment. Hereby, in one configuration, a changed electrical operating parameter can be reacted to continuously in real time by means of the control signals.

On comparing the current measurement value with the comparative value, it can be determined which portion of the UV light emitting diodes of the arrangement is no longer functional and/or is functional to a reduced extent. For example, a relative portion of the UV light emitting diodes can be determined which is no longer functional and/or is functional to a reduced extent.

Here, a no longer existing and/or reduced functionality can be established for example when it is determined that at least a portion of the UV light emitting diodes is emitting a reduced light output which lies below a threshold value. The reduced light output can be the result, for example, of an aging of the UV light emitting diodes. Similarly, in the case of failure of one or more of the UV light emitting diodes, a functionality no longer exists.

On comparing the current measurement value with the comparative value, it can be determined whether the current measurement value exceeds or falls below a comparative threshold value, and a warning signal can be generated and emitted via an output system, which indicates a malfunction of the UV lighting system. Thus, for example, it can be established whether the portion of the UV light emitting diodes which are no longer functional exceeds a threshold value, for example a threshold value which indicates a failure of a relative portion of up to approximately 10% or up to approximately 5%, whereupon control signals can be generated for the delivery of the warning signal and/or of a change in operation, for example the feeding of further water via the inlet can be throttled or stopped entirely, at least temporarily, by means of an associated valve system.

The determining of the exceeding/falling below the threshold value can be carried out for several partial arrangements of UV light emitting diodes respectively separately or for the entire arrangement of UV light emitting diodes. Accordingly, the warning signal can indicate the malfunction for one or more partial arrangements or for the entire arrangement of UV light emitting diodes.

The reactor device can be an industrial-scale system for the disinfection of water, in which the water which is to be disinfected is directed through the reactor chamber with a minimum throughput of approximately 2 $m^3/h$. Such industrial-scale systems or plant concern for example reactor devices for the provision of public water supply or reactor devices for the provision of process- or service water in industrial plant.

The following can be provided: (i) An optical operating parameter is detected by the monitoring system, which parameter indicates for the wavelength of the UV light of the UV light emitting diodes the transmission in the water which is to be disinfected; (ii) a current transmission measurement value is compared with a comparative transmission value; and (iii) the control signals are generated as a function of the result of the comparison of current transmission measurement value and comparative transmission value. Alternatively or additionally, a light intensity measurement value can be determined, in particular for determining of the (current) transmission value.

In particular, the following can be provided: (i) An optical operating parameter is detected by the monitoring system, which parameter indicates for the wavelength of the UV light of the UV light emitting diodes the transmission in the water which is to be disinfected; (ii) a current light intensity value is compared with a comparative light intensity value; and (iii) the control signals are generated as a function of the result of the comparison of current light intensity value and comparative light intensity value.

In this embodiment, the monitoring of the at least one electrical operating parameter is supplemented by the monitoring of at least one optical operating parameter for the operation of the UV lighting system, wherein here the propagation of the UV light in the water which is to be disinfected is measured. Here, a spectrally narrow-band monitoring of the transmission for (only) the wavelength of the UV light emitted by the UV light emitting diodes is provided, for example at a wavelength of 254 nm.

With known transmission behaviour of the water for UV light, the measured transmission can indicate in a supplementary manner information concerning the correct operation of the UV light emitting diodes. This information can then be drawn upon in a supplementary manner in the generating of the control signals. Thus, provision can be made that a warning signal concerning the at least partial failure of UV light emitting diodes is only generated when both the at least one electrical operating parameter and also the optical operating parameter indicate this. In this way, the operational reliability is increased.

Provision can be made that the transmission and/or light intensity is detected by means of a (calibratable) optical sensor which is arranged on the edge side on the reactor chamber. Additionally or alternatively, further optical sensors can be arranged within the reactor chamber for the detection of transmission(s) and/or light intensity/intensities, for instance of various UV light emitting diodes.

The further optical sensors can be arranged for example at the arrangement of UV light emitting diodes and/or the (rod-shaped) UV lamps. In particular, the further optical sensors can be arranged between partial arrangements of UV light emitting diodes (of a UV lamp), for instance on a shared LED board. Further optical sensors of a first UV lamp can be configured to detect transmissions of UV light emitting diodes of a second UV lamp (which is different from the first UV lamp). In this way, a network of sensors can be provided, by which transmission- and/or intensity changes can be detected in an improved manner, and a more precise control is enabled. Provision can be made that the further optical sensors of a UV lamp are at least partially optically shielded with respect to the UV light emitting diodes of the (same) UV lamp.

The sensor value of the (calibratable) optical sensor can be compared with further sensor values of the further optical sensors, wherein in particular the sensor value of the optical sensor can be used as reference value.

Provision can be made to generate control signals which bring about at least one of the following operational changes for the operation of the reactor device: Switching off of the arrangement of UV light emitting diodes or at least of one of the partial arrangements hereof; dimming of the arrangement of UV light emitting diodes or at least of one of the partial arrangements hereof; switching on of the arrangement of UV light emitting diodes or at least of one of the partial arrangements hereof; connecting of at least one further partial arrangement of UV light emitting diodes to an already switched on partial arrangement of UV light emitting diodes; changing a throughflow quantity of the water which is to be disinfected in the reactor chamber by means of a throughflow regulating system associated with the reactor chamber, which throughflow regulating system is connected to the control system; a switching on or off of a circulating system, which is configured to circulate the water which is to be disinfected in the reactor chamber and is connected to the control system.

The dimming of the arrangement of UV light can take place in particular as a function of a particular transmission and/or throughflow quantity.

The configurations described above in connection with the method for disinfecting water can be provided accordingly in connection with the reactor device.

DESCRIPTION OF EXAMPLE EMBODIMENTS

Further example embodiments are explained in the following with reference to figures of a drawing. In the figures.

Figure 1:
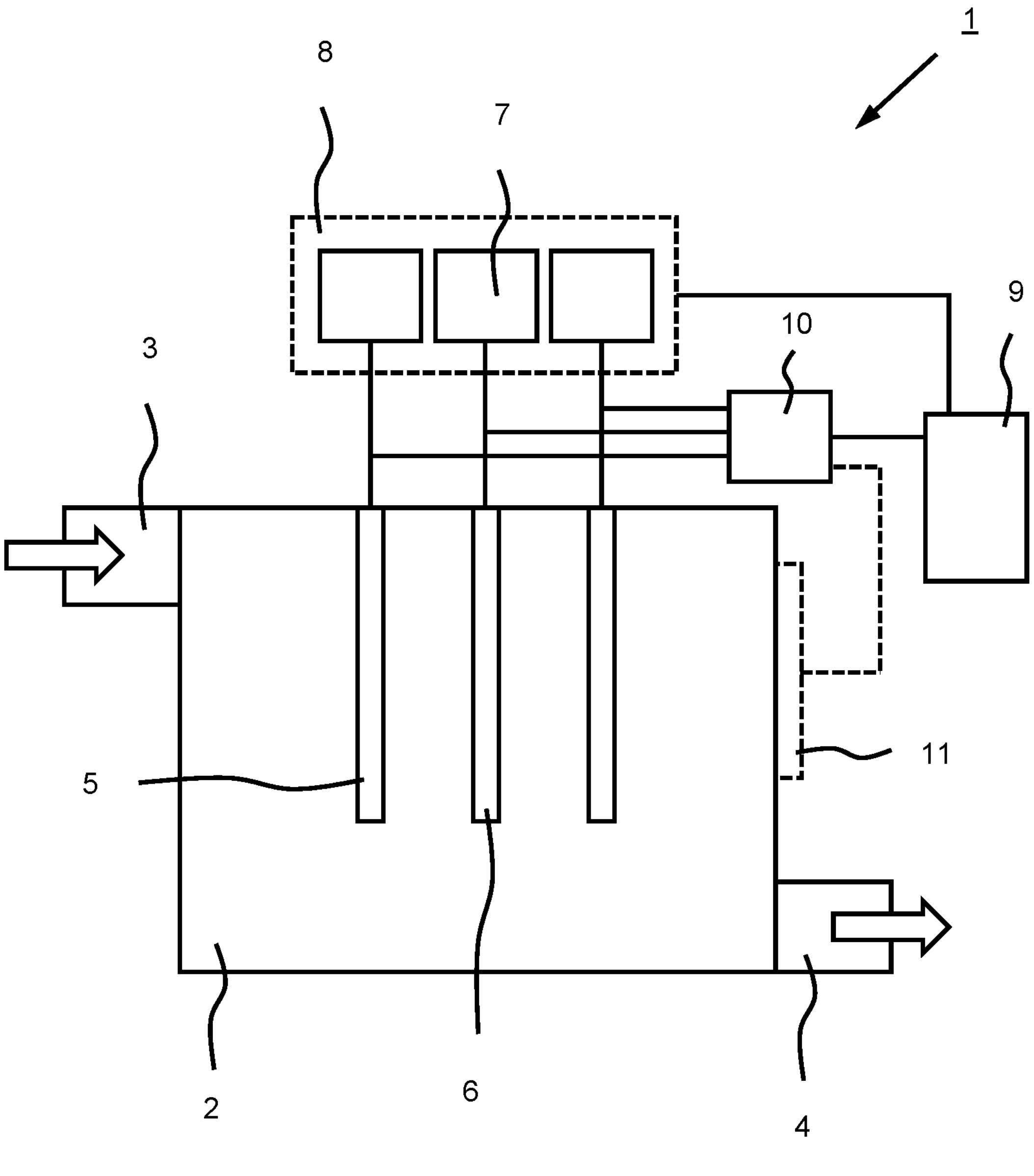
FIG. 1 shows a schematic illustration of a reactor device for disinfecting water such as drinking water, waste water, service water or process water by means of UV lighting.

FIG. 1 shows a schematic illustration of a reactor device 1 for disinfecting water such as drinking water, waste water, service water, process water, or the like by means of UV lighting. In a reactor chamber 2, the water which is to be disinfected is introduced via an inlet 3. After the disinfecting, the water leaves the reactor chamber 2 via an outlet 4. The reactor device 1 can concern an industrial-scale plant for the disinfection of water, in which the water which is to be disinfected is directed through the reactor chamber 2 with a minimum throughput of approximately 2 $m^3$ per hour.

In the reactor chamber 2, the water is exposed to UV light, therefore is irradiated herewith, which is provided by means of a UV lighting system 5, which in the illustrated example embodiment is formed by three rod-shaped UV lamps 6. The rod-shaped UV lamps 6 extend at least partially into the reactor chamber 2 and, during the disinfecting of the water, are circulated around by the latter, so that the UV light is applied efficiently onto the water.

Figure 3:
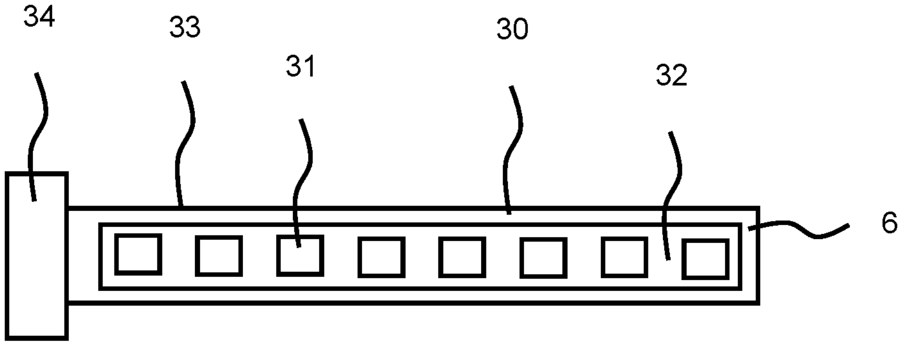
FIG. 3 shows a schematic illustration of a rod-shaped UV lamp with an arrangement of UV light emitting diodes.

FIG. 3 shows a schematic illustration for an example of the UV lamps 6, in which along a rod-shaped portion 30 a partial arrangement of UV light emitting diodes 31 is formed, which are arranged on a board 32, with which also a cooling body can be formed, so that heat occurring in operation of the UV light emitting diodes 31 is dissipated. Alternatively to a shared cooling body, a cooling body can be associated respectively individually to the UV light emitting diodes 31.

The arrangement of UV light emitting diodes 31 is surrounded in the region of the rod-shaped portion 30 by an encasing tube 33, which enables the radiation of the UV light into the surrounding reactor chamber 2. For example, the encasing tube 33 is made of quartz glass.

The rod-shaped portion 30 is formed on a base portion 34, in which for example a connection system can be arranged in order to connect electrical leads.

Provision can be made that by means of the arrangement of UV light emitting diodes 31, UV light is radiated in at least two directions, for example on the front and on the rear side, wherein this is realized by arrangements of UV light emitting diodes 31 which are formed separately from one another.

According to FIG. 1, a respective driver circuit 7 is associated with the rod-shaped UV lamps, which is configured to operate the respective arrangement of UV light emitting diodes 31 of the rod-shaped UV lamps 6 for the disinfection of the water. The driver circuits 7 can be embodied in an integrated manner with a superordinate or shared driver circuit 8, which is indicated by means of dashed lines in FIG. 1.

The driver circuits 7 receive control signals for the operation of the rod-shaped UV lamps 6 from a control system 9. The control system 9 is connected to a monitoring system 10, which is configured to detect at least one electrical operating parameter for the UV lighting system 5. Provision can be made here to detect at least one electrical operating parameter separately respectively for the rod-shaped UV lamps 6, therefore in particular for the respective partial arrangement of UV light emitting diodes of the rod-shaped UV lamp 6. Alternatively or additionally, provision can be made to detect one or more electrical operating parameters for the entirety of the rod-shaped UV lamps 6, therefore the UV lighting system 5. For example, current- and/or voltage measurement vales can be detected with the aid of one or more comparator circuits. With the aid of the comparator circuit(s) for example overcurrents or undercurrents can be measured with respect to a comparative current value.

The currently detected measurement values are compared with comparative values, so that, derived from the result of the comparison, control signals for the operation of the reactor device 1 can be generated by means of the control system 9, in particular for the operation of the rod-shaped UV lamps 6, whether for the rod-shaped UV lamps respectively individually or as a whole. To carry out the comparison, one or more logic circuits can be provided, which for example are integrated at least partially into the control system 9.

In this way, directly characteristic operating parameters are detected for the operation of the rod-shaped UV lamps 6, in particular in order to ensure that the UV light is emitted with a predetermined light output into the water which is to be disinfected, which is no longer the case when a portion of the UV light emitting diodes ages or even fails entirely.

Provision can be made here to define a threshold value for the measured electrical operating parameter so that, on exceeding or falling below the threshold value, a warning signal is generated by means of the control system 9 and is emitted via an output system 20 (cf. FIG. 2) coupling hereto. This can concern here a video- and/or an audio signal, for example in a monitoring control room for the reactor system 1.

Figure 2:
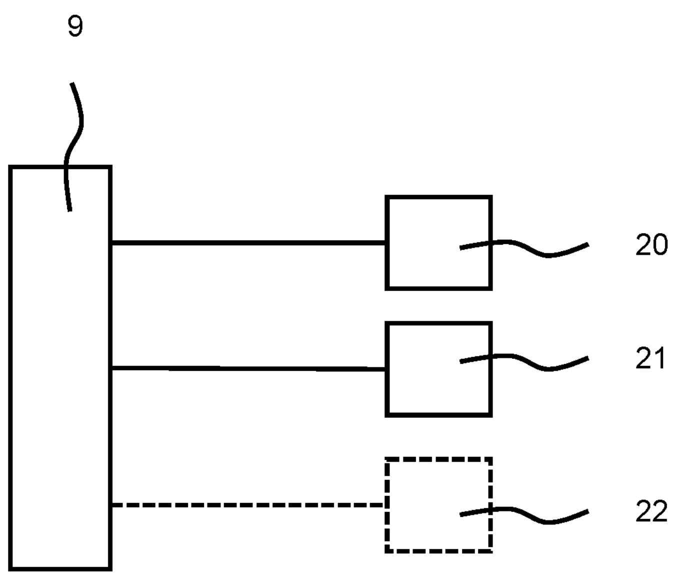
FIG. 2 shows a schematic detail illustration of a part of the reactor device of FIG. 1 with a control system and systems connected herewith.

According to FIG. 2, the control system 9 in the shown exemplary embodiment is furthermore connected to a database 21, by means of which, for example, different comparative values can be provided. Optionally, the control system 9 can be connected to a further system 22, for example a server system, by which expanded computing capacity can be provided, for example in the evaluating of the measurement values and the comparative values.

In the reactor device 1 according to FIG. 1, the monitoring system 10 is optionally formed with an optical sensor 11, by which at least one optical operating parameter can be measured during the disinfecting of the water, for example a measurement value for the transmission of the UV light in the reactor chamber 2. Hereby, additional information can be detected for the monitoring of the correct operation of the rod-shaped UV lamps 6 by means of the monitoring system 10, which can be taken into consideration on generating of the control signals by the control system 9.

The optical sensor 11 can be configured to detect the optical operating parameter in a narrow-band wavelength range of the UV light, for example with a measurement wavelength of 254 nm. The measured transmission can indicate the current light output emitted by the UV lighting system 5 as a whole or by individual ones of the UV lamps 6. In particular, a light intensity (in $W/m^2$) can be determined for the UV light in the water which is to be disinfected, for example for determining the transmission. The information concerning the optical operating parameter is helpful for the detection of a possible (partial) failure of the UV light emitting diodes of the rod-shaped UV lamps 6.

The features disclosed in the above description, in the claims and in the drawing can be of importance both individually and also in any desired combination for the realization of the various embodiments.

The invention claimed is:

1. A method for disinfecting water such as drinking water, waste water, service water, or process water, by means of UV lighting in a reactor device, in which water which is to be disinfected is introduced via an inlet in a reactor chamber of the reactor device, the water which is to be disinfected in the reactor chamber is illuminated with UV light by means of a UV lighting system, and disinfected water is discharged from the reactor chamber via an outlet, wherein the following is provided:

provision of the UV light by means of an arrangement of UV light emitting diodes of the UV lighting system of the reactor device;

operating the UV light emitting diodes by means of a driver system of the reactor device associated with the arrangement of UV light emitting diodes;

controlling an operation of the driver system by means of a control system of the reactor device;

monitoring of at least one electrical operating parameter for the arrangement of UV light emitting diodes during the disinfecting of the water by means of the UV light using a monitoring system of the reactor device, which is connected to the control system;

comparing a current measurement value for the at least one electrical operating parameter, which is detected by means of the monitoring system, with a comparative value for the at least one electrical operating parameter;

generating control signals as a function of the result of the comparison of current measurement value and comparative value for the at least one electrical operating parameter by means of the control system; and controlling the operation of the reactor device in accordance with the control signals, wherein a UV lighting system is used, in which the arrangement of UV light emitting diodes comprises a plurality of partial arrangements of UV light emitting diodes, which form a respective UV lamp and which in operation of the UV lighting system are operated separately from one another by means of the driver system and are controlled separately from one another by means of the control system, in such a way that the at least one electrical operating parameter is detected respectively separately for the plurality of UV lamps, so that an individual monitoring of the respective partial arrangement of UV light emitting diodes is enabled, and the control system generates individual control signals for the respective partial arrangement of UV light emitting diodes, and wherein the control signals bring about an operating change, comprising changing a throughflow quantity of the water which is to be disinfected in the reactor chamber by means of a throughflow regulating system associated with the reactor chamber, which is connected to the control system.

2. The method according to claim 1, characterized in that a UV lighting system is used, in which the arrangement of UV light emitting diodes is formed on a rod-shaped UV lamp, wherein a lamp portion with the arrangement of UV light emitting diodes is arranged at least partially immersing into the water which is to be disinfected in the reactor chamber.

3. The method according to claim 1, characterized in that on monitoring of the at least one electrical operating parameter, a current measurement value and/or a voltage measurement value is detected for the arrangement of UV light emitting diodes, which is compared with a comparative current value/comparative voltage value.

4. The method according to claim 1, characterized in that for monitoring the at least one electrical operating parameter and for comparing the current measurement value, a circuit arrangement with a comparator circuit and with a logic circuit is used.

5. The method according to claim 1, characterized in that during the operation of the UV lighting system, on monitoring of the at least one electrical operating parameter for the arrangement of UV light emitting diodes, detection is carried out continuously.

6. The method according to claim 1, characterized in that on comparing of the current measurement value with the comparative value, it is determined which portion of the UV light emitting diodes of the arrangement are no longer functional.

7. The method according to claim 1, characterized in that on comparing the current measurement value with the comparative value, it is determined whether the current measurement value exceeds or falls below a comparative threshold value, and a warning signal is generated and emitted via an output system, which indicates a malfunction of the UV lighting system.

8. The method according to claim 1, characterized in that the reactor device is an industrial-scale system for the disinfection of water, and the water which is to be disinfected is guided through the reactor chamber with a minimum throughput of approximately 2 $m^3$/h.

9. The method according to claim 1, characterized in that with the monitoring system, in addition to the electrical operating parameters, an optical operating parameter is detected, which indicates the transmission in the water which is to be disinfected for the wavelength of the UV light of the UV light emitting diodes;

a current transmission measurement value is compared with a comparative transmission value; and the control signals are generated as a function of the result of the comparison of current transmission measurement value and comparative transmission value.

10. The method according to claim 1, characterized in that control signals are generated, which bring about at least one of the following operating changes for the operation of the reactor device:

switching off the arrangement of UV light emitting diodes or at least one of the partial arrangements hereof;

dimming the arrangement of UV light emitting diodes or at least one of the partial arrangements hereof;

switching on the arrangement of UV light emitting diodes or at least one of the partial arrangements hereof;

connecting at least one further partial arrangement of UV light emitting diodes to an already switched-on partial arrangement of UV light emitting diodes;

changing a throughflow quantity of the water which is to be disinfected in the reactor chamber by means of a throughflow regulating system associated with the reactor chamber, which is connected to the control system; and switching on or switching off a circulation system, which is configured to circulate the water which is to be disinfected in the reactor chamber and is connected to the control system.

11. A reactor device for disinfecting water such as drinking water, waste water, service water, or process water by means of UV lighting, with:

a reactor chamber for receiving water which is to be disinfected;

a UV lighting system with an arrangement of UV light emitting diodes for the UV illuminating of the water which is to be disinfected in the reactor chamber;

a driver system, which is associated with the arrangement of UV light emitting diodes;

a monitoring system;

a control system, which is connected to the monitoring system and to the driver system; and a throughflow regulating system connected to the control system;

wherein the reactor device is configured for the following:

delivering the water which is to be disinfected via an inlet in the reactor chamber, illuminating the water which is to be disinfected with UV light in the reactor chamber by means of the UV lighting system, and discharging of disinfected water from the reactor chamber via an outlet;

providing the UV light by means of the arrangement of UV light emitting diodes;

operating the UV light emitting diodes by means of the associated driver system;

controlling an operation of the driver system by means of the control system;

monitoring of at least one electrical operating parameter for the arrangement of UV light emitting diodes during the disinfecting of the water by means of the UV light with the aid of the monitoring system;

comparing a current measurement value for the at least one electrical operating parameter, which is detected by means of the monitoring system, with a comparative value for the at least one electrical operating parameter;

generating control signals as a function of the result of the comparison of current measurement value and comparative value for the at least one electrical operating parameter; and controlling the operation of the reactor device in accordance with the control signals, wherein a UV lighting system is provided, in which the arrangement of UV light emitting diodes comprises a plurality of partial arrangements of UV light emitting diodes, which form a respective UV lamp and which in operation of the UV lighting system can be operated separately from one another by means of the driver system and can be controlled separately from one another separately from one another by means of the control system, such that the at least one electrical operating parameter can be detected respectively separately for the plurality of UV lamps, so that an individual monitoring of the respective partial arrangement of UV light emitting diodes is enabled, and the control system is configured to generate individual control signals separately for the respective partial arrangement of UV light emitting diodes, and wherein the control signals bring about an operating change, comprising changing a throughflow quantity of the water which is to be disinfected in the reactor chamber by means of the throughflow regulating system associated with the reactor chamber.

* * * * *